US005359282A

United States Patent [19]

Teii et al.

[11] Patent Number: 5,359,282

[45] Date of Patent: Oct. 25, 1994

[54] PLASMA DIAGNOSING APPARATUS

[75] Inventors: Shinriki Teii; Kibatsu Shinohara, both of Yokohama; Kozo Obara, Kamakura; Tsuku Umezawa, Yokohama, all of Japan

[73] Assignees: Nichimen Kabushiki Kaisha, Osaka; Nihon Kosyuha Kabushiki Kaisha, Yokohama, both of Japan

[21] Appl. No.: 910,143

[22] PCT Filed: Nov. 15, 1991

[86] PCT No.: PCT/JP91/01568

§ 371 Date: Jul. 15, 1992

§ 102(e) Date: Jul. 15, 1992

[87] PCT Pub. No.: WO92/09185

PCT Pub. Date: May 29, 1992

[30] Foreign Application Priority Data

Nov. 16, 1990 [JP] Japan .................................. 2-310411
Mar. 13, 1991 [JP] Japan .................................. 3-073832

[51] Int. Cl.[5] ............................................ G01N 27/06

[52] U.S. Cl. .................................... 324/71.1; 422/53; 324/464

[58] Field of Search ............... 324/71.1, 464; 250/382; 422/53

[56] References Cited

U.S. PATENT DOCUMENTS 4,023,931 5/1977 Wolfgram ........................... 324/71.1
4,922,205 5/1990 Shimizu et al. .................... 324/71.1

FOREIGN PATENT DOCUMENTS 58-171821 10/1983 Japan .................................. 324/71.1
62-23254 5/1987 Japan .
01162141 6/1989 Japan .
3-15197 1/1991 Japan .
0315197 1/1991 Japan .

*Primary Examiner*—Maura K. Regan
*Attorney, Agent, or Firm*—Finnegan, Henderson, Farabow, Garrett and Dunner

[57] ABSTRACT

A plasma diagnosing apparatus for performing plasma diagnosis witch probes having a high degree of cleanliness by removing contamination caused by reactive plasma, etc., while quantitatively detecting a degree of the contamination of the probes. The disclosed apparatus avoids the disadvantages of conventional apparatuses, in which the voltage-current characteristics of the probes are deteriorated by growth of the contaminant film formed on the probes, making it difficult to measure the parameters of the plasma conditions.

7 Claims, 5 Drawing Sheets

PLASMA DIAGNOSING APPARATUS

BACKGROUND OF THE INVENTION

1. Field of the Invention

The present invention relates generally to a plasma diagnosing apparatus, and more specifically to a plasma diagnosing apparatus capable of detecting and removing contamination of the probe.

2. Description of Related Art

In recent years, the plasma processing techniques such as plasma CVD, plasma polymerization, etc., have been widely adopted in various fields of technology. Since most of these techniques employ the reactive plasma, a problem will arise as to contamination of a probe at the time of diagnosing the plasma using such probe.

Recently, not only the basic study in the plasma has made its advancement, but also its applications in various industrial fields have been broadened. As the result, it has become necessary to diagnose instantaneously from outside various parameters within the plasma, in particular its electron temperature and electron density. The so-called "triple probe direct viewing method", as the method of diagnosis, is the most effective way, with which these parameters are instantaneously indicated on the gauges.

In general, there are two principal methods of diagnosing the plasma parameters: the one is a probing method, by which electrodes are directly intromitted into the plasma to take out electric current from it, and then the current is analyzed to find out the parameters of the plasma; and the other is an electromagnetic wave method, by which microwaves, lasers, and others are put into the plasma to directly sense out the results of their interaction, or to detect, by spectroscopy, a beam to be emitted from the plasma, to thereby find out these parameters.

While this latter method, i.e., the electromagnetic wave method is excellent in its horological resolution, it has disadvantages such that the device becomes complicated in its structure, hence expensive in its manufacture. In contrast to this, the former method, i.e., the probing method is characteristically excellent in its spatial resolution, simple in the device construction, and can be manufactured at a low cost, although the plasma to be diagnosed is limited to one having a relatively low temperature and low density.

In general, since most of the plasma used in laboratories, etc. is of relatively low temperature and low density, probing method is the fundamental for diagnosing the plasma having its electron density Ne of as low as $10^{14}cm^{-3}$ or below and its electron temperature Te of as low as a few tens of electron volts (eV) or below.

In case the parameters of the reactive plasma are to be diagnosed by the probing method, the surface of the probe becomes covered with a contaminant film as the time passes by, with the consequence that the exposed part of the probe is required to be cleaned.

There has heretofore been adopted a method for cleaning the probe with it being installed in the vacuum device, wherein, after a reactive gas is exchanged for an inactive gas as the case may be, a negative voltage is imparted to the probe with respect to a reference electrode to bring it to a red heat condition by the ion bombardment for removal of the contaminant film.

When, however, the ionic energy increases, the heat generation on the surface of the probe also increases, so that, for avoiding destruction of the probe due to heating, the voltage and other parameters should be controlled with care. The manual control of these parameters was fairly difficult and cleaning of the probe was often unsatisfactory, or the probe becomes molten due to excessive voltage application, hence good result could not always be obtained.

In the diagnosis of the reactive plasma by means of the conventional plasma diagnosing apparatus, if the reactive plasma is silane gas plasma, for example, an amorphous silicon film is produced on the surface of the probe with passage of time, and, if the plasma is styrene plasma, a styrene polymer film is produced on the surface of the probe. On account of this, the voltage-current characteristic of the probe changes with growth of the film, its shape becomes distorted, and the measurement finally becomes impossible.

When the abovementioned conventional plasma diagnosing probe was used, no reliable results of measurement could be obtained, because there was no quantitative method of detecting cleanliness of the probe, on account of which the probe had to be used without warranty of its cleanliness, and further, magnitude, imparting time, etc. of the negative voltage to be imparted to the probe at the time of removing the contaminant film by the ion bombardment were irregular and not consistent. As to the contamination detecting method, trials have so far been done in some area such as observation of the ionosphere by a rocket, wherein an alternating current is applied to the probe in a thin plasma to detect contamination of the probe in utilization of the hysteresis phenomenon due to the polarity in the electric potential. This detection method, however, was limited only to such thin plasma, and there were also many uncertain factors such that, depending on the type of contaminants, no hysteresis phenomenon appears, or inversely, depending on electric potential, frequency for voltage application, etc. , the hysteresis phenomenon varies, and so forth. As the consequence, it was difficult to adopt this contamination detection method as the general method for detecting the contamination of probe under extensive plasma conditions.

Also, as to cleanliness of the probe, the applicant has already proposed, in his prior patent application No. 149221/1989 (Laid-Open Patent Application No. 15197/1991), a method for automatic cleaning of a probe for measuring the plasma parameters. The invention is directed to obtain an appropriate cleaning effect with a ratio between the measuring time (diagnosing time) and the cleaning pulse width being made constant.

However, while the cleaning method is effective in the case where the diagnosing time using the voltage-current characteristic is long, as is the case with the general probing method, it is not necessarily effective for the triple probing method.

That is to say, the triple probe method is one which carries out the diagnosis by first placing three probes, each having an equal area, in mutually adjacent relationship at positions in the plasma where the equipotential seems to exist, and then by applying electric voltages of different potentials to each of these probes. While this method is an excellent one capable of directly reading the parameters of the plasma instantaneously, it is still not suitable for the abovementioned cleaning method, because of shortness in its diagnosing time.

SUMMARY OF THE INVENTION

An object of the present invention is to provide a plasma measurement device capable of performing the plasma measurement by sufficient cleaning of the probe, even with the triple probing method of short diagnosing time.

Another object of the present invention is to provide a plasma diagnosing apparatus that is capable of rendering the detection of the cleanliness of the probe to be quantitative, hence continuously measuring the plasma with the probes by repeating the quantitative detection and removal of contaminants, while retaining the cleanliness with a certain definite value even in a reactive plasma.

To achieve these and other objects of the present invention a plasma diagnosing apparatus comprises a plurality of probes for plasma diagnosis inserted into plasma: first measuring circuit to measure saturated ion current by applying a negative voltage to at least one of said probes: second measuring circuit to measure saturated electron current by applying a positive voltage to the remainder of said probe; and a circuit to calculate a ratio between said saturated ion current and said saturated electron current. Degree of contamination of the probe, i.e., cleanliness of the probe can be measured by first measuring the saturated ion current by applying a negative voltage to at least one probe, then measuring the saturated electron current by applying a positive voltage to the remainder of the probes, and calculating a ratio between these two measured values. Cleaning of the contaminated probe can be done by applying a negative voltage from a negative voltage feeding circuit by a circuit change-over device such as a switch, etc. so as to cause sputtering, in which ions are bombarded.

DESCRIPTION OF THE PREFERRED EMBODIMENTS

In the following, the plasma diagnosing apparatus according to the present invention will be explained concretely in reference to the accompany drawings.

In the preferred embodiments of the present invention, it is possible to quantitatively detect the contaminant film on the probe under most of the plasma conditions, in utilization of the phenomenon that a ratio between the saturated electron current and the saturated ion current of the probe is substantially determined only by the kind of gas, which ratio is constant. Also, it is possible to perform the continuous measurement, while maintaining a constant cleanliness, by alternative use of a plurality of the probes.

Figure 4:
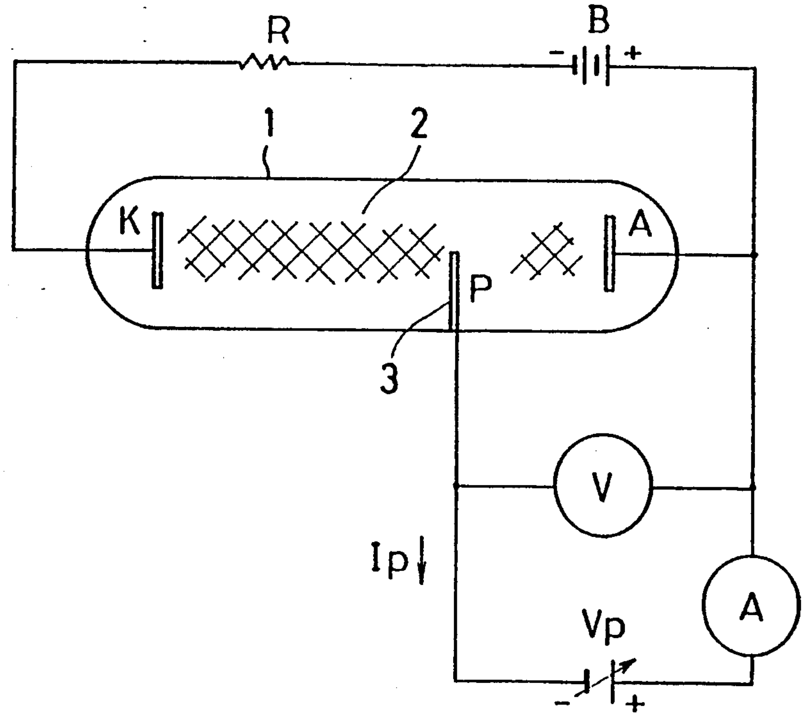
FIGS. 4 and 5 are explanatory diagrams for the function and operation of the present invention.
Figure 5:
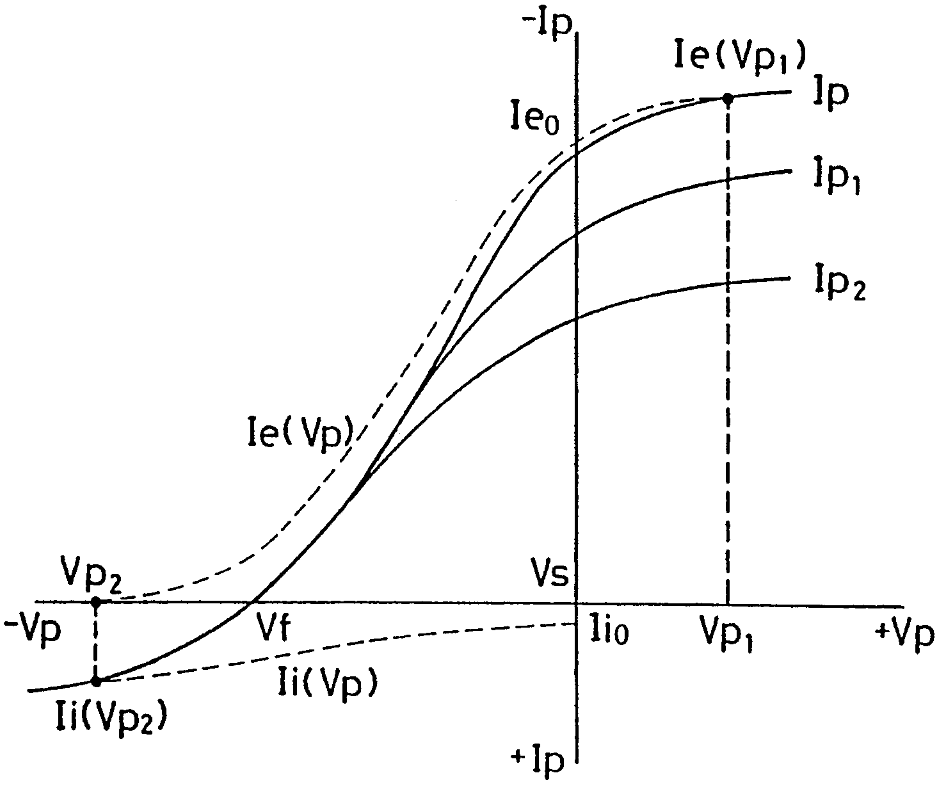

As shown in FIG. 4, when an electric potential Vp is applied to a single probe 3 placed within a plasma 2 in a discharge chamber 1 to change the plasma space potential Vs at a position where the probe 3 is placed, from its negative potential to the positive one, the relationship between the current Ip flowing through the probe 3 and its potential Vp is as shown in FIG. 5 with a solid line Ip. This current Ip is a sum of the electron current Ie(Vp) shown with a broken line in FIG. 5 and the ion current Ii(Vp). If the values of Ie(Vp) and Ii(Vp) in the space potential Vs are respectively represented by Ieo and Iio, the ratio can be represented as follows, under a relatively low gas pressure discharge, wherein the condition for production of the ion sheath is established:

$$Ieo/Iio = 0.654\ (mi/me)^{0.5}.$$

That is to say, this ratio is a value to be determined only by a mass ratio (mi/me) of the ion and the electron. From the space potential Vs, both electron current Ie(Vp) at the positive potential and ion current Ii(Vp) at the negative potential increases with expansion of the sheath, and a ratio at two arbitrary points, $Vp_1$ and $Vp_2$, can be represented as follows:

$$Ie(Vp_1)/Ii(Vp_2) \approx Ieo/Iio \cdot f(Vp_1/Vp_2).$$

Hence, so far as both $Vp_1$, and $Vp_2$ at their constant values are imparted to the probe, this ratio maintains a constant value to be determined only by the type of gas.

However, when the contaminant film is produced on the surface of the probe, the electron current, in particular, the one flowing through the probe decreases remarkably due to lowering of its electrical conductivity, as indicated by $Ip_1$, and $Ip_2$ in FIG. 5. Accordingly, at the start of the measurement, the value of the current ratio of the probes in their clean condition, $Ie(Vp_1)/Ii(Vp_2)$, is measured and stored, and any decrease in the current ratio thereafter is measured, whereby it is possible to know the cleanliness of the probes quantitatively.

No sooner the measuring probes will depart from a certain permissible range of cleanliness as established than is imparted a sufficient quantity of the negative voltage so as to remove the contaminant film by the ion bombardment. Upon restoration of the current ratio to its initial value as memorized, the measurement is resumed. By repetition of these operations, it becomes possible to perform the continuous measurement of the probes, while maintaining their cleanliness in the reactive plasma within a certain definite value. At a relatively high pressure, under which no sheath producing conditions can be established, the current ratio Ieo/Iio becomes dependent on a temperature ratio Te/Ti of the electron temperature Te and the ion temperature Ti. Under the same discharging conditions, however, Te/Ti is constant. Accordingly, only the initial value to be memorized is different, even in this case, and the detection of cleanliness of the probe can be done in the same manner.

When the surface of the probe becomes contaminated by the formation of the film of foreign substances, both saturated electron current and saturated ion current decrease, the rate of decrease of the former being very fast and large. For example, when a microwave power was imparted to a gaseous body at a pressure of $10^{-2}$ Torr, consisting of a mixture of hydrogen gas and 10% methane ($CH_4$), which was confined in a vessel of 150 mm in diameter, to generate plasma, followed by insertion of a tungsten probe having a diameter of 0.5 mm and a length of 5 mm into the plasma 2 as shown in FIG. 4 to measure the plasma current Ip, the saturated electron current decreased by 20% in the initial 20 sec. period, and then to about one quarter of the initial value after elapse of two minutes, as indicated with solid lines $Ip_1$ and $Ip_2$ in FIG. 5.

The rate of formation of the contaminant film depends on the pressure at the discharge as well as density of the reactive gas. In addition, the ion current also decreases to a certain degree by the contamination. Therefore, in order to make accurate detection of the contamination, at least two probes (or two groups of the probes) are used. A negative constant voltage $Vp_2$ is sufficiently imparted to any one probe (or one group of probes)—the probe $P_2$ in the embodiment of FIG. 1. While constantly keeping it clean by the ion bombardment, the ion current $Ii(Vp_2)$ flowing through the probe is made a reference for measurement of the cleanliness. The remaining one probe (or one group of the probes)—the probe $P_1$ in FIG. 1—is used for the measurement of contamination by periodical application of a constant voltage $Vp_1$ to determine the cleanliness from a ratio between the electron current $Ie(Vp_1)$ and the ion current $Ii(Vp_2)$, When the cleanliness becomes lower than a certain permissible range, the measurement is stopped promptly to effect removal of the contaminant film by the application of sufficient negative voltage to the probe. In this case, if the probes in even number are used, the measurement may be done by automatic change-over of the switch to the other probe, without necessity for waiting restoration of the one probe under measurement to its cleanliness. In this case, since the other probe is originally kept in its clean state, continuous measurement can be done without interruption.

Figure 1:
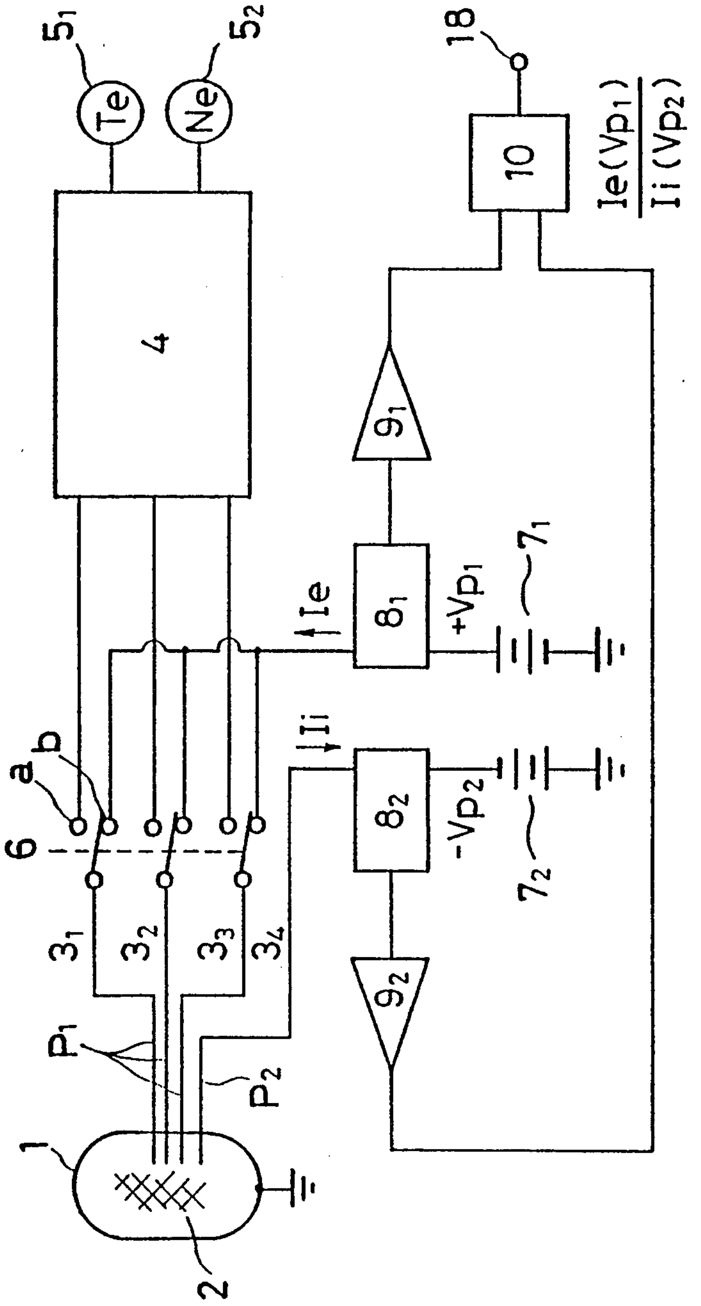
FIG. 1 is a system diagram showing one embodiment of the plasma diagnosing apparatus according to the present invention.

FIG. 1 is a system diagram showing one embodiment of a contamination detecting device for plasma diagnosis, when applied to the triple probe measurement system, wherein the entire probes are divided into two groups; and a positive voltage is applied to one of these groups to find the saturated electron current, and a negative voltage is imparted to the other group to measure the saturated ion current; and a degree of contamination (cleanliness) of the probes is detected from a ratio of these saturated electron current and saturated ion current. In the drawing, three probes $3_1$, $3_2$, and $3_3$ in the plasma 2, produced by generation of microwave within the earthed discharge vessel, are grouped to be designated as $P_1$, and another probe $3_4$ is designated as $P_2$.

The outputs from these three probes $3_1$, $3_2$, and $3_3$ are alternately changed over by a switch 6 to both sides "a" and "b": it is turned to the side "a" during the diagnosis of the plasma parameters, a predetermined voltage being applied from the measuring circuit to each of the probes in the group $P_1$ to carry out the diagnosis, and those parameters of Te (electron temperature), Ne (electron density), etc. are calculated and produced as outputs on the indicator gauges $5_1$ and $5_2$.

In the case of detecting the cleanliness, the switch 6 is turned to the side "b", and a voltage at about +30 volts sufficient for saturating the electron current is applied to the three probes $3_1$, $3_2$, and $3_3$ from a constant voltage source $7_1$ at a voltage indicated by "$+Vp_1$" through an insulated coupling element $8_1$, whereby the saturated electron current $Ie(Vp_1)$ flows. This saturated electron current passes through the insulated coupling element $8_1$, is amplified by an amplifier $9_1$, and reaches a division circuit 10. For this insulated coupling element, there may be used various ones such as a photo-isolator, in which the current is intercepted with a direct current to cause the signal component alone to pass.

A voltage of about −90 volts sufficient for the ion-sputtering is always imparted to the other probe $P_2$ from a constant voltage source $7_2$ at a voltage indicated by $-Vp_2$, through an insulated coupling element $8_2$, to maintain the probe in a clean condition; at the same time, the saturated ion current $Ii(Vp_2)$ to be a reference for the cleanliness flows through the probe, passes through the insulated coupling element $8_2$, is amplified by an amplifier $9_2$, and reaches the division circuit, in the same manner as mentioned above.

In this division circuit 10, a voltage corresponding to the saturated electron current $Ie(Vp_1)$ as amplified by the amplifier $9_1$ is divided by a voltage corresponding to the saturated ion current $Ii(Vp_2)$ as an output from the amplifier $9_2$, and an output which corresponds to the cleanliness is introduced into a terminal 18, from which value a degree of contamination of the probe is determined.

Upon termination of the measurement on the cleanliness of the probe at its initial condition, the switch 6 is turned to the side "a" to carry out the required diagnosis by means of the measuring circuit 4.

As soon as the diagnosis of the plasma parameters has ended, the switch 6 is again turned to the side "b" to carry out the measurement of cleanliness, as mentioned above. In the course of repeating these steps, when the cleanliness is lowered to a predetermined value for caution, the measurement is stopped, and the cleaning of the probe is effected.

Figure 2:
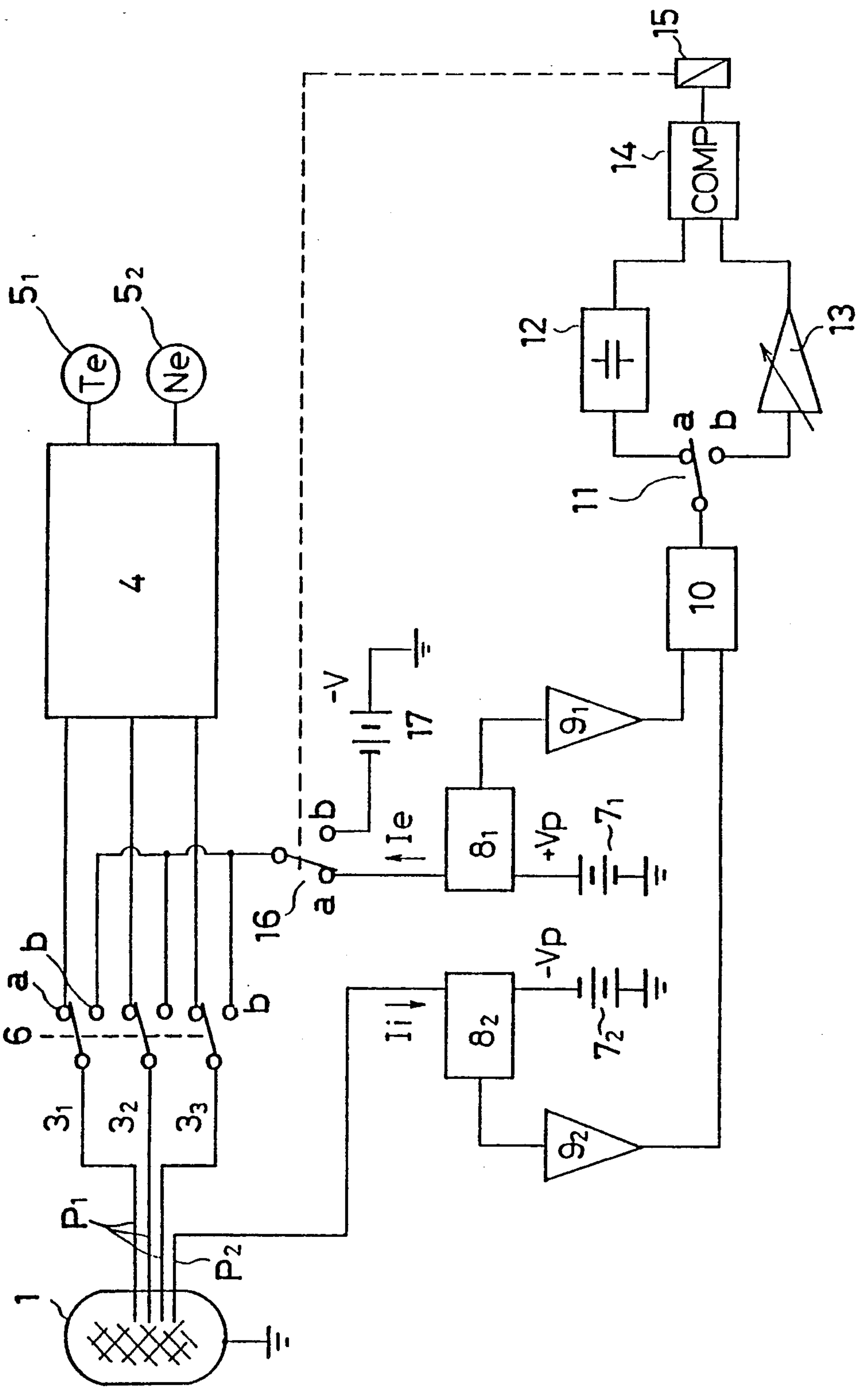
FIG. 2 is a system diagram showing another embodiment of the present invention.

In the case of adding a probe cleaning circuit to the contamination detecting device for the abovementioned plasma diagnosing probe, it may be sufficient to incorporate into the circuit of FIG. 1 the cleaning circuit, the initial cleanliness memory circuit, and others, as shown in FIG. 2. That is to say, a relay contact point 16 is provided at the output of the probe to additionally install a probe cleaning circuit which functions to impart, as soon as the cleanliness becomes lower than a set value, a negative voltage of about 90 volts is applied to the entire probes of the group $P_1$ from the power source 17, the voltage of which is designated by −V, to clean the entire probes $P_1$ by the ion bombardment.

At the beginning of the measurement, the switch 6 is turned to the side "b", and the relay contact point 16 is turned to the side "a", respectively. Thereafter, in the same manner as in the case of FIG. 1, an initial current ratio $\{Ie(Vp_1)/Ii(Vp_2)\}$ in the clean condition of the probe is found by the division circuit 10. At this instant, since the switch 11 is turned to the side "a", a voltage corresponding to the initial current ratio is retained in the initial cleanliness memory circuit of an accumulation circuit 12. Thereafter, the switch 11 is turned to the side "b".

In the next place, the switch 6 is turned to the side "a" to apply a predetermined voltage to each of the probes through the measuring circuit 4, Whereby the parameters Te (electron temperature) , Ne (electron density), etc. are calculated, and produced as outputs on the gauge $5_1$, $5_2$.

Subsequently, the switch 6 is turned to the side "b" to amplify a voltage corresponding to the current ratio after the second measurement onward by means of an amplifier 13, and to compare its value by means of a comparator 14, with a voltage corresponding to the initial current value as stored in the accumulation circuit 12.

The degree of amplification of this amplifier 13 could better be established so that a product with a desired cleanliness to be restored may become 1. That is to say, when it is desired to clean the probe in the state of its cleanliness being set at 90%, a point, at which a voltage corresponding to the initial current ratio as stored in the accumulation circuit 12 becomes equal to an output voltage of the amplifier 13, as the result of increased contamination, provided that the degree of amplification is set at (1/0.9=1.111) times, is detected by the comparison circuit 14, with which output a relay 15 is actuated to turn the relay contact point 16 to the side "b" to connect the probe $P_1$ to the power source 17.

A negative voltage of about −90 volts is supplied from this power source 17 to cause ions to bombard at the probe, thereby being able to remove the contaminants on the surface of the probe by the sputtering action. While the required time for applying the voltage depends on the extent of contamination, about a few seconds will be sufficient if the contamination is slight. Upon termination of removal of the contaminant film, the operation will return to the start, and the diagnosis is continuously repeated.

Figure 3:
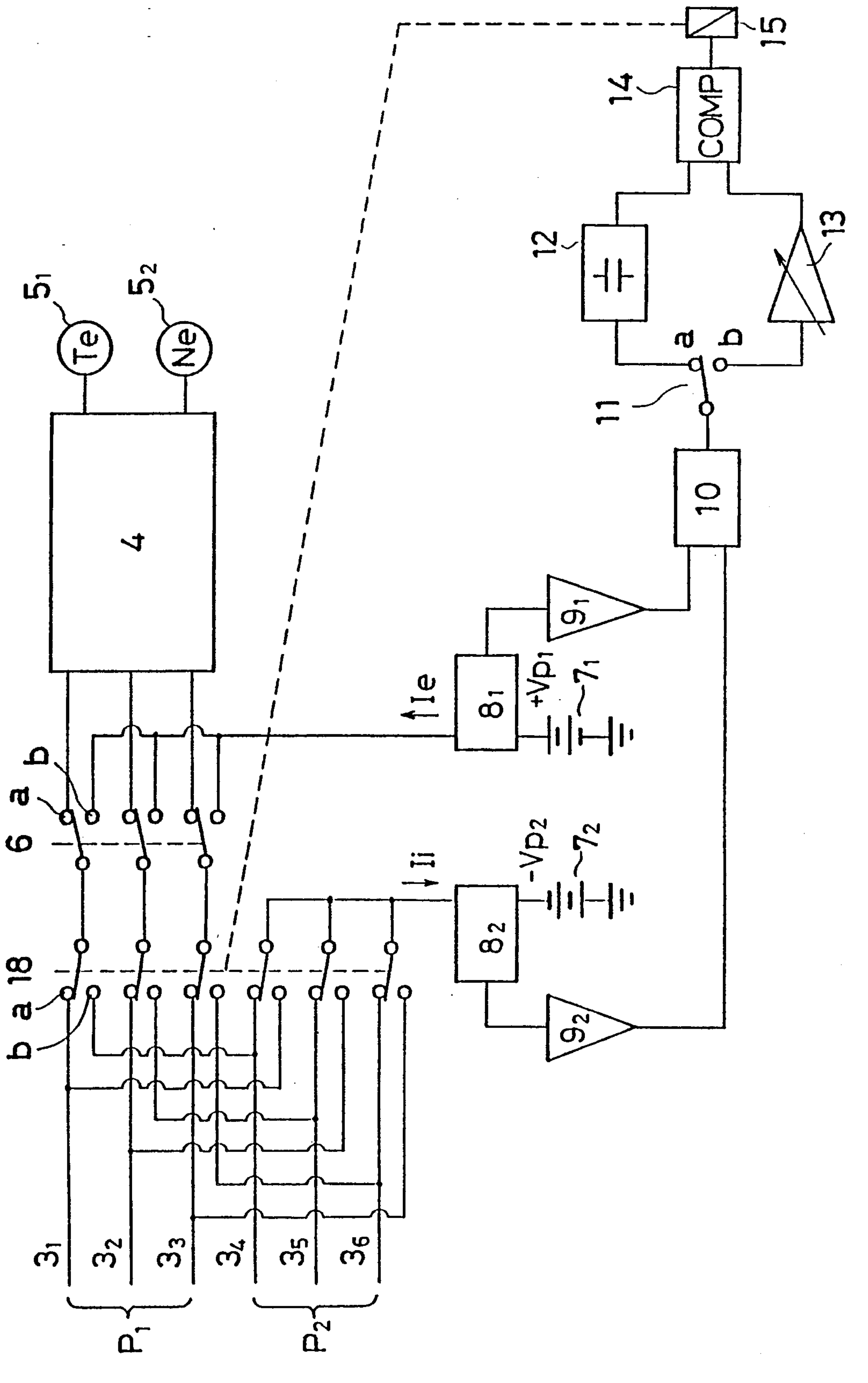
FIG. 3 is a system diagram showing an embodiment of the present invention, when the probes are divided into a plurality of groups.

When the triple probe capable of instantaneously measuring the values is used as a monitor device, a plurality of groups of the probes are employed. FIG. 3 shows its embodiment, which makes it possible to avoid the problem of the probe contamination, and to perform the continuous measurement of the probe contamination so as to constantly maintain it within a certain definite range of cleanliness. In the drawing, two groups of triple probes $P_1$ ($3_1$, $3_2$, $3_3$) and $P_2$ ($3_4$, $3_5$, $3_6$) are inserted into the plasma (not shown in the drawing). One of the groups is used for the measurement, while the other group is kept clean by application of a negative voltage. When the group of the measuring probes decreases its cleanliness below its set value, it is exchanged with the other group of the clean probes by operation of the relay switch 18 so as to effect, without interruption, the measurement using the group of the clean probes. The relay switch 18 is not necessarily a mechanical relay switch, but it may of course be of any type having the relay function. In the drawing, reference numerals of the other parts are the same as those in FIG. 2.

In FIG. 3, the relay switch 18 is of a hexa-polar double throw type, which, when turned to the side "a", renders the triple probe group $P_1$ to be in a measuring condition, whereby a sufficient negative voltage is imparted to the triple probe group $P_2$ and the contaminants on the surface of the probe are removed by the ion-sputtering action. When the switch 6 is turned to the side "a", a predetermined voltage is imparted to the triple probe group from the measuring circuit 4 to carry out the required measurement, and the parameters such as Te, Ne, and so forth are calculated and are produced as outputs on the indicator gauges $5_1$, $5_2$. When the switch 6 is turned to the side "b", a sufficient positive voltage is applied to the probe group $P_1$, and the saturated electron current $Ie(Vp_1)$ flows therethrough: on the other hand, since the ion current $Ii(Vp_2)$ flows in and through the other probe group $P_2$ by the sufficient negative voltage, there can be obtained a voltage corresponding to the cleanliness by the division circuit, in the same manner as in the case of FIG. 2. If and when the switch 6 is made to repeat its on-and-off operations at a certain definite time interval during a period of measurement, the cleanliness of the probe becomes deteriorated with passage of time. Therefore, arrangement is so made that, when a voltage corresponding to the cleanliness becomes lower than a certain established value, the relay 15 is actuated and the relay switch 18 thereof is changed over to bring the probe group $P_2$ into its measuring condition, whereby the probe group $P_1$ is brought to a state of cleaning operation.

At this time, while one of the probe groups is in the state of measurement, the other probe group is in the state of sufficient cleaning operation by sputtering due to a certain definite negative voltage $-Vp_2$; hence, at the time of change-over from one probe group to the other, the clean probe group always starts the measurement. As the consequence, in this embodiment, perfectly continuous measurement becomes possible without interruption whatsoever.

Incidentally, at the time of cleaning the probes by the sputtering, if and when an over-current is caused to flow, the probes would be heated to burn, even when the imparting time is controlled. Therefore, for the power source $7_2$ of $-Vp_2$ and the power source 17 of −V, it is preferable to use those power sources having a constant current property to thereby limit the sputtering current.

At each of the abovementioned control operations, the relay switches 6 and 11 may all be subjected to on-and-off by a control circuit (not shown in the drawing), as established beforehand.

By the practice of the preferred embodiments of the present invention, it has become possible to continuously measure the cleanliness of the probes over a long period of time, while maintaining the same within a certain definite value of cleanliness. In the experiments, a hydrogen gas mixture containing therein 10% methane gas ($CH_4$) was introduced into a plasma chamber of 150 mm in diameter, to which microwave power was imparted for excitation, thereby generating plasma. The measuring time for the cleanliness in one time was about 100 m. sec., and the diagnosing time of the plasma parameters in one time was about 5 sec. The measurements of the electron temperature Te and the electron density Ne, for several times, by means of the present diagnosing apparatus using a tungsten probe revealed that the value of $\{Ie(Vp_1)/Ii(Vp_2)\}$ decreased by 90%. Then, immediately, the contaminant film was removed by the circuit of the preferred embodiments of the present invention with the consequence that the continuous measurement for several hours was made possible.

Further, in case use was made of the triple probes capable of directly reading the plasma parameters, the plasma measurement could be done continuously for a long period of time by the embodiment of FIG. 3.

Figure 6:
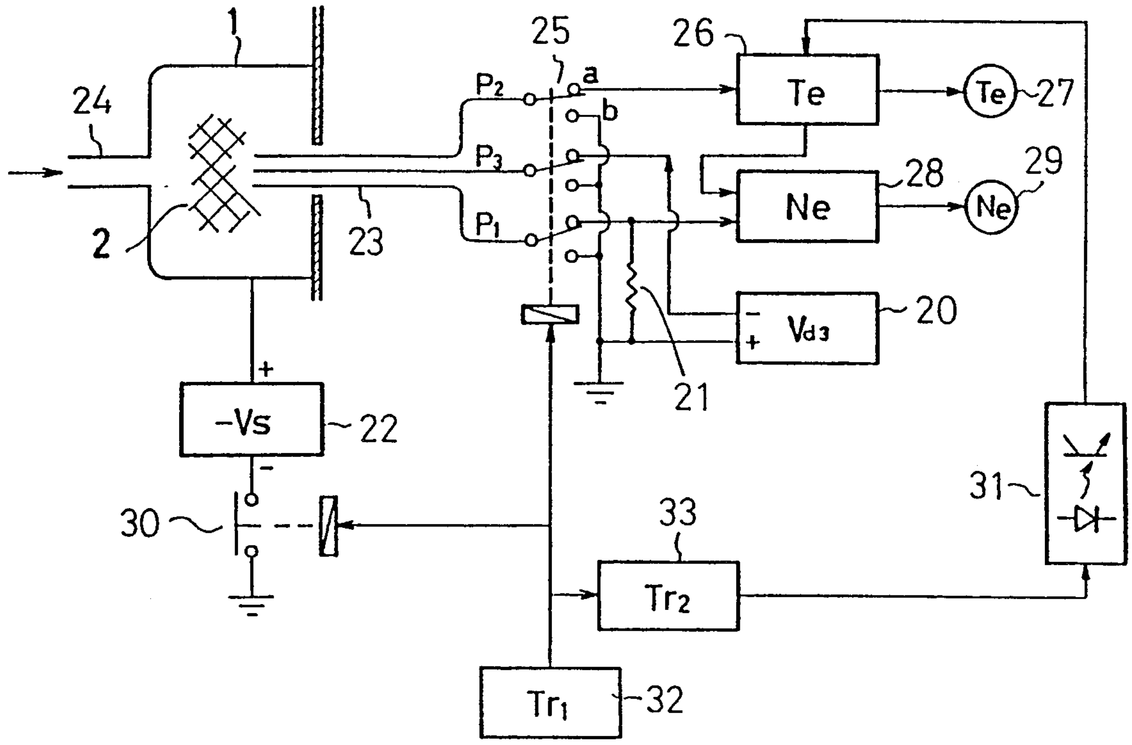
FIG. 6 is a system diagram showing one embodiment of the plasma diagnosing apparatus using triple probes.

FIG. 6 is a system diagram showing another embodiment of the present invention. A specimen gas is introduced into a plasma discharge vessel 1 made of a metal material and microwave power is supplied from an inlet port 24, whereby plasma 2 fills the interior of the plasma discharge vessel 1. Into this plasma 2, there are inserted three adjacent probes 23 ($P_1$, $P_2$ and $P_3$), which can be changed over between the measuring circuit at the side "a" and the probe cleaning circuit at the side "b".

Figure 7:
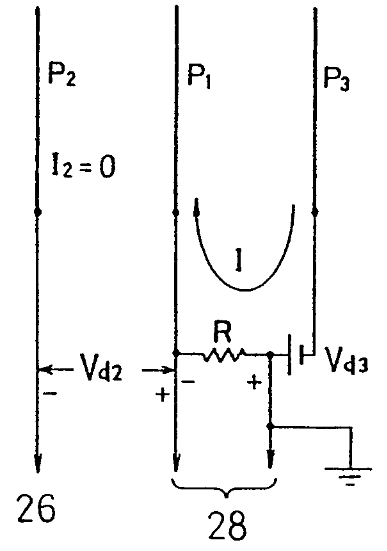
FIG. 7 is an explanatory diagram for circuit wiring of the triple probes.

The measuring circuit has its input as shown in FIG. 7, wherein the probe $P_2$ is measured by the electron temperature measuring circuit 26 which is a voltmeter having a high input impedance, the value being indicated on an indicator gauge 27.

A negative voltage of about 10 volts is applied to the probe $P_3$ from a power source 20 having a constant voltage $Vd_3$.

In the probe $P_1$, there takes place a voltage drop due to current I flowing from the probe $P_3$ through a low resistance 21 of about 1 ohm; which is introduced into an electron density measuring circuit 28. A measured value of the electron temperature Te is imparted to this measuring circuit. Since the electron quantity or the molecular quantity M of ions and the surface area S of the probes are given in advance by manual operations, the electron density Ne is found by calculation, and the value is indicated on an indicator gauge 29.

In the state of the relay switch 25 being turned to the side "b", the entire probes are grounded, and an electric potential of about 90 volts from a sputtering power source is imparted to the plasma discharge vessel 1 to render the entire probes to be negative, whereby the contaminants adhered onto the surface of the probe are removed by the ion bombardment.

These operations are automatically done in the control circuits 32, 33. In the triple probe plasma diagnosing circuit according to the preferred embodiments of the present invention, since the required time is as short as 10 m. sec., the probe contamination is very slight and, accordingly, the sputtering time may be sufficient for about 1 second. Therefore, 1-second pulse is produced in the control circuit 32, with the output of which the relay switch 25 and sputtering control relay 30 are controlled to thereby clean the probes.

When the pulse in this control circuit 32 terminates, the relay switch 25 is turned to the side "a", to interrupt the sputtering control relay 30, hence it is brought to a state of measurement. At this juncture, the control circuit 33 is actuated to generate a pulse of about 10 m. sec., forwards a control pulse to the electron temperature measuring circuit 26 through an insulated coupling element 31 such as a photo-isolator, etc., and indicates the plasma parameters Te and Ne on the indicator gauges.

In the case of the continuous measurement, these measured values are preserved for the next measurement, and, at the end of the 10 m. sec. pulse, 1-second pulse is formed in the control circuit 13 to clean the probe, thereby continuing the measurement.

When the contaminant film is formed on the surface of the probe, both saturated electron current and saturated ion current decreases, the former having a very large rate of decrease and the latter being slow in its decrease with low rate of change. On account of this, mal-effect of the contamination begins to emerge in a few seconds after commencement of the diagnosis.

With the preferred embodiments of the present invention, however continuous observation becomes possible over a long period of time. In the experiments, a mixed gas of hydrogen gas at a pressure of 0.2 Torr and 10% methane ($CH_4$) was introduced into a chamber of 150 mm in diameter: to this mixed gas, microwave power of 2.45 GHz and 300 W was imparted to generate plasma. Continuous observation could be achieved without anomaly for a length of a few hours.

Susceptibility to Industrial Use

The preferred embodiments of the present invention are directed to a plasma diagnosing apparatus having the above-described construction and a method for measuring cleanliness of probes, with which the cleanliness of the probes becomes able to be detected quantitatively. On account of this, by repeating quantitative detection and removal of the contaminants, it becomes possible to carry out the continuous measurement with the probes, while maintaining their cleanliness within a certain definite value, even in the reactive plasma, hence there is no possibility of the measurement becoming impracticable due to contamination of the probes, as in the conventional apparatus.

We claim:

1. A plasma diagnosing apparatus, comprising
a plurality of probes for diagnosing plasma, for insertion into the plasma;
first measuring means for measuring saturated ion current by application of a negative voltage to one of said probes;
second measuring means for measuring saturated electron current by application of a positive voltage to another one of said probes; and
means for determining a ratio between said saturated ion current and said saturated electron current.

2. A method for measuring a degree of contamination of probes, comprising the steps of
inserting a plurality of probes in a plasma;
applying a negative voltage to one of said probes to measure the saturated ion current;
applying a positive voltage to another one of said probes to measure the saturated electron current; and
determining a ratio between said saturated ion current and said saturated electron current.

3. A plasma diagnosing apparatus comprising:
a plurality of plasma diagnosing probes, for insertion into the plasma;
first measuring means for measuring saturated ion current by application of a negative voltage to one of said probes;
second measuring means for measuring saturated electron current by application of a positive voltage to another one of said probes;
means for determining a ratio between said saturated ion current and said saturated electron density to detect a degree of contamination of the probes;
a negative voltage feeding circuit for cleaning the probes; and
means for connecting said second measuring means and said negative voltage feeding circuit with the remainder of said probes.

4. A plasma diagnosing apparatus as set forth in claim 3, wherein said negative voltage feeding circuit includes means for supplying a constant current.

5. A plasma diagnosing apparatus as set forth in claim 1 or 3, wherein the probe connected to the first measuring means and the probe connected to the second measuring means are interchangeably connected by a switching means.

6. An apparatus comprising:
a plurality of probes;
means for removing contaminant film from one of the probes by generating a negative voltage
means for measuring a plasma parameter by generating a measuring voltage; and
means for connecting a first one of the plurality of probes to the removing means while connecting a second one of the plurality of probes to the measuring means, and for connecting the second one of the plurality of probes to the removing means while connecting the first one of the plurality of probes to the measuring means.

7. A plasma diagnosing apparatus comprising:

a plurality of probes;

means for measuring a contaminant on the probes by generating a first measuring voltage;

means for measuring a plasma parameter by generating a second measuring voltage;

means for connecting the contaminant measuring means to a first one of the probes while disconnecting the plasma measuring means from the first one of the probes, and for connecting the plasma parameter measuring means to the first one of the probes means while disconnecting the containment measuring means from the first one of the probes.

* * * * *

UNITED STATES PATENT AND TRADEMARK OFFICE

CERTIFICATE OF CORRECTION

PATENT NO. : 5,359,282
DATED : October 25, 1994
INVENTOR(S) : SHINRIKI TEII ET AL.

It is certified that error appears in the above-indentified patent and that said Letters Patent is hereby corrected as shown below:

On the title page:

Abstract line 2, change "witch" to -- with --.

Signed and Sealed this

Tenth Day of January, 1995

Attest:

BRUCE LEHMAN

*Attesting Officer* *Commissioner of Patents and Trademarks*